(12) United States Patent
Keller et al.

(10) Patent No.: US 7,785,725 B2
(45) Date of Patent: Aug. 31, 2010

(54) COMPOUND FOR A SOLID OXIDE FUEL CELL STACK GASKET

(75) Inventors: Joseph M. Keller, Grand Blanc, MI (US); Walter Symons, Grand Blanc, MI (US); William J. LaBarge, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 1444 days.

(21) Appl. No.: 11/003,897

(22) Filed: Dec. 3, 2004

(65) Prior Publication Data

US 2006/0121327 A1    Jun. 8, 2006

(51) Int. Cl.
*H01M 2/08* (2006.01)
*H01M 8/10* (2006.01)

(52) U.S. Cl. .............................. 429/30; 429/509; 501/32
(58) Field of Classification Search .................. 429/35, 429/37
See application file for complete search history.

(56) References Cited

U.S. PATENT DOCUMENTS

| | | | | |
|---|---|---|---|---|
| 2,776,472 A | * | 1/1957 | Mesick | 228/124.6 |
| 2,962,136 A | * | 11/1960 | Pincus | 428/630 |
| 4,755,274 A | * | 7/1988 | Mase et al. | 204/427 |
| 6,430,966 B1 | | 8/2002 | Meinhardt et al. | |
| 2002/0068677 A1 | * | 6/2002 | Crosbie | 501/32 |
| 2004/0151968 A1 | * | 8/2004 | Warrier et al. | 429/35 |

OTHER PUBLICATIONS

Hellmig, Ralph and Ferkel, Hans, Using Nanoscaled Powder as an Additive in Coarse-Grained Poweder, Journal of the American Ceramic Society, vol. 84 [2] 261-266 (2001). Available online at http://www.blackwell-synergy.com/doi/pdf/10.1111/j.1151-2916.2001.tb00647.x.*
Hellmig et al., Using Nanoscaled Powder as an Additive in Coarse-Grained Powder, 2001, vol. 84 of J. Am. Ceramic Society, pp. 261-266.*

(Continued)

*Primary Examiner*—Patrick Ryan
*Assistant Examiner*—Stephen Yanchuk
(74) *Attorney, Agent, or Firm*—Thomas N. Twomey

(57) ABSTRACT

In a solid-oxide fuel cell assembly comprising a plurality of components having electrically-conductive mating surfaces therebetween, the surfaces are sealed by an electrically insulating gasket that include a mineral composition comprising about 66 mol % MgO and about 33 mol % $SiO_2$, the mineral composition being known mineralogically as forsterite. A brazing alloy may be applied to enhance bonding of the gasket into place. The gasket composition may include additions of $Al_2O_3$ to enhance electrical resistivity while having little to no impact of matching expansion coefficients of the gasket and metal mating surfaces. Also, additions such as titania or zirconia to inhibit glassy phase grain boundaries and the formation of impurities and pores in the ceramic grain boundaries may be used. A recommended particle size distribution of precursor powders is disclosed that leads to an optimum microstructure of the sintered gasket.

29 Claims, 2 Drawing Sheets

OTHER PUBLICATIONS

Larsen, P.H., et al., "Stacking of Planar SOFCs", Proc. 4th Int. Symp. Solid Oxide Fuel Cells, vol. 95-1, pp. 69-78, 1995 (no month available).

Gunther, C., et. al.,"The Stability of the Sealing Class AF 45 In H2/H2O—and 02/N2—Atmospheres", Proc. 5th Int. Symp. Solid Oxide Fuel Cells, vol. 97-18, pp. 746-756, 1997 (no month available).

Ley, K. L., et al., "Glass-Ceramic Sealants for Solid Oxide Fuel Cells: Part I. Physical Properties", J. Mater. Res., vol. 11, No. 6, pp. 1489-1493, Jun. 1996.

Sakaki, Y. et al.,, "Glass-Ceramics Sealants in CaO-Al2O2-SiO2 System", Proc. 5th Int. Symp. Solid Oxide Fuel Cells, vol. 97-18, pp. 652-660, 1997 (no month available).

* cited by examiner

COMPOUND FOR A SOLID OXIDE FUEL CELL STACK GASKET

TECHNICAL FIELD

The present invention relates to fuel cells; more particularly, solid-oxide fuel cell assemblies which operate at elevated temperatures; and most particularly, to a gasket material compound for electrically insulating and/or gasketing joints between components of such fuel cell assemblies.

BACKGROUND OF THE INVENTION

Fuel cells for combining hydrogen and oxygen to produce electricity are well known. A known class of fuel cells includes a solid oxide electrolyte layer through which oxygen anions migrate; such fuel cells are referred to in the art as "solid-oxide" fuel cells (SOFCs).

In some applications, for example, as an auxiliary power unit (APU) for an automotive vehicle, an SOFC stack assembly is preferably fueled by "reformate" gas, which is the effluent from a catalytic gasoline oxidizing reformer. Reformate typically includes amounts of carbon monoxide (CO) as fuel in addition to molecular hydrogen. The reforming operation and the fuel cell operation may be considered as first and second oxidative steps of the liquid hydrocarbon, resulting ultimately in water and carbon dioxide. Both reactions are exothermic, and both are preferably carried out at relatively high temperatures, for example, in the range of 650° C. to 900° C.

A complete fuel cell stack assembly comprises a plurality of components and sub-assemblies joined together mechanically to provide the desired flow paths and control pathways for the reactive gases, spent gases, and cooling gases. It is essential that the joints or interfaces between the components and sub-assemblies be durably leak-free at temperatures from below 0° C. to as high as at least 900° C., at pressures from subatmospheric to up to several atmospheres. Such conditions place very high demands on materials selected for gaskets at these joints and interfaces.

It has been proposed to use various glass and ceramic compositions as SOFC sealants, based on boron, phosphate, and silica, as referenced in U.S. Pat. No. 6,430,966. These glass/ceramic sealants are also useful as dielectric insulators between adjacent cell elements at different voltage potentials. However, these sealants have some known drawbacks.

At operating temperatures, phosphate glasses are too volatile and react with the anode material to form various nickel phosphorous compounds. They also show low stability in humidified fuel gas. Borosilicates are known to react with a humidified hydrogen atmosphere to form the gaseous species $B_2(OH)_2$ at operating temperature, and thus the seal corrodes with time.

Typically, glass seals require high-temperature heat treatment (700° C.-900° C.) during manufacture of a fuel cell system, during which the glass softens and flows to fill the interface between the components and bonds to the surfaces. Upon further heating and increased time, the melt devitrifies to form the final microstructure desired for the application. This seal provides a good insulating joint and a good initial bond joint. The seal functions satisfactorily until the stack assembly undergoes multiple thermal cycles when it becomes prone to crack propagation. Because of localized differences in the coefficients of thermal expansion of the components and the glass seals, and because the glass may be progressively crystallized, the seal may fracture, resulting in gas leakage and failure of the fuel cell stack assembly. As the leak increases progressively, cell output diminishes until the total voltage output is unacceptably low.

A material used in forming sealing gaskets known in the prior art, as disclosed in U.S. Pat. No. 6,430,966, is a silicate based glass that exhibits high chemical resistance and minimal interaction with other fuel cell materials. A known material for such use is a blend of metal (M) oxides, $M_AO_X+ M_BO_Y+SiO_2$, wherein $M_A$ may be barium, strontium, calcium, or a combination thereof and $M_B$ may be aluminum, boron, phosphorus, gallium or lead, or a combination thereof. $M_BO_Y$ modifies the softening temperature of the glass and the combination of $M_AO_X$ and $SiO_2$ offers an improved coefficient of thermal expansion.

The material also provides good insulation and a good initial bond joint. However, it is prone to micro-cracking at low temperatures, increased brittleness with time during operation, and loss of bond strength with thermal cycles. Therefore, it can be difficult to maintain an adequate seal during repeated thermal cycling.

Glass seals made of compositions known in the art are also commonly prone to process variation. When fabricated from tape cast film that includes a glass frit and an organic binder, seal space can be difficult to control. This is because, during the initial heating of the SOFC stack, the binder burns out and a significant amount of shrinkage occurs. Depending on the compressive load, time under load, and heating/cooling rates in the application, it is difficult to reproduce the structure of the crystallized glass with each fabricated stack assembly. Further, flow properties of the material are very sensitive to average particle size and particle size distribution of the glass frit which is the precursor powder for the glass joint.

What is needed is a material for gasketing in an SOFC system which is thermally stable over the range between shutdown and operating temperatures for both the reformer and the fuel cell assembly; which is chemically stable in oxidizing and reducing environments; which is acceptably rugged for assembly and operation of the system; which can provide a dielectric function; which matches the coefficient of thermal expansion of stainless steel elements in the fuel cell assembly; and which is compatible with other materials of the system.

It is a principal object of the present invention to provide an improved material for hermetic sealing and electrically insulating gasketing joints in a fuel cell assembly.

SUMMARY OF THE INVENTION

Briefly described, in a solid-oxide fuel cell assembly comprising a plurality of components having electrically-conductive mating interfaces therebetween, at least some of the component surfaces are electrically insulated from each other by gaskets that include the mineral composition forsterite, having a formula $Mg_2SiO_4$. $Al_2O_3$ is an excellent dielectric having a high dielectric value measures in the range of 8.5 to 10.5 at $10^6$ Hz at 25° C. Also, it is capable of bonding to many ceramics, including yttrium-stabilized zirconium (YSZ), and is readily brazed to the oxide layer formed on many metals at elevated temperatures. Therefore, the sintered forsterite gasket, in accordance with the invention, can be sealed into place with a braze alloy, as known in the art, to join the gasket to the adjacent metal surface of the SOFC component. Alternately, $Al_2O_3$ can be added to the forsterite composition at a mol fraction of up to 20% to enhance electrical resistivity. In the preferred composition, the gasket composition consists of less than 5 mol % $Al_2O_3$ in order to maintain a favorable coefficient of thermal expansion of the composition.

In the preferred composition, the coefficient of thermal expansion of forsterite matches that of the mating surface, for example, stainless steel. The composition is fabricated into gasket sheets having full density at relatively low firing temperatures and a broad process range of temperatures. The pore-free pre-formed sheeted gasket can then be applied into the seal space and bonded to the two component surfaces by brazing. Alternately, instead of pre-forming into gaskets, one or more of the component surfaces may be coated directly with the composition using known methods of thermal spraying or vapor deposition.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
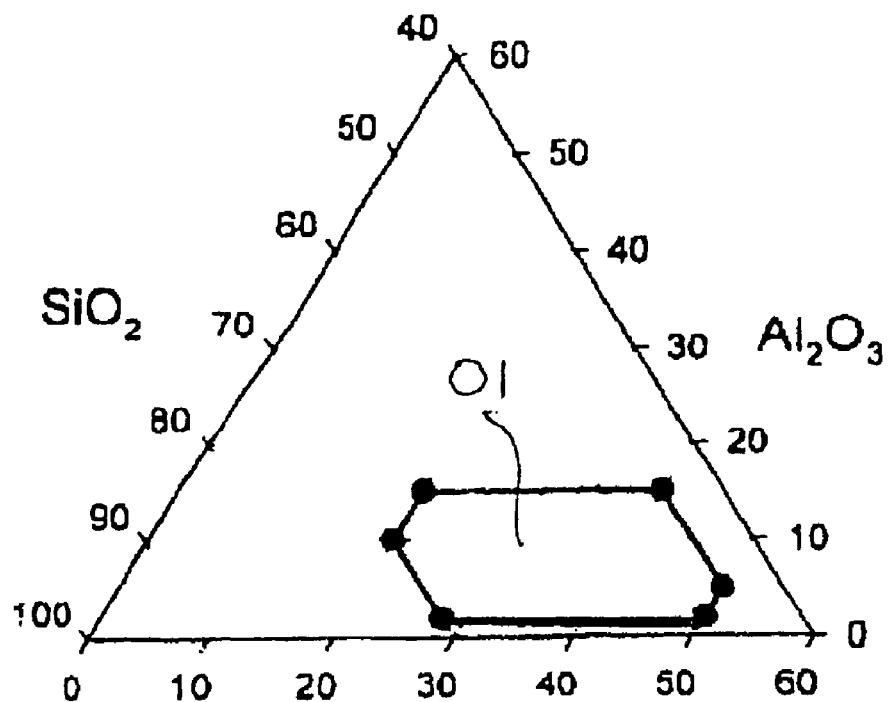
FIG. 1 is a ternary composition chart of $SiO_2$, $Al_2O_3$, and BaO, showing a region of glass compositions suitable for prior art fuel cell gaskets, as disclosed in U.S. Pat. No. 6,430,966.

Referring to FIG. 1, a prior art glass composition 01, as disclosed in U.S. Pat. No. 6,430,966, comprises a range of between about 2% and about 15% $Al_2O_3$, between about 45% and about 70% $SiO_2$, and between about 20% and about 50% BaO. There is no magnesium content in the disclosed composition.

Figure 2:
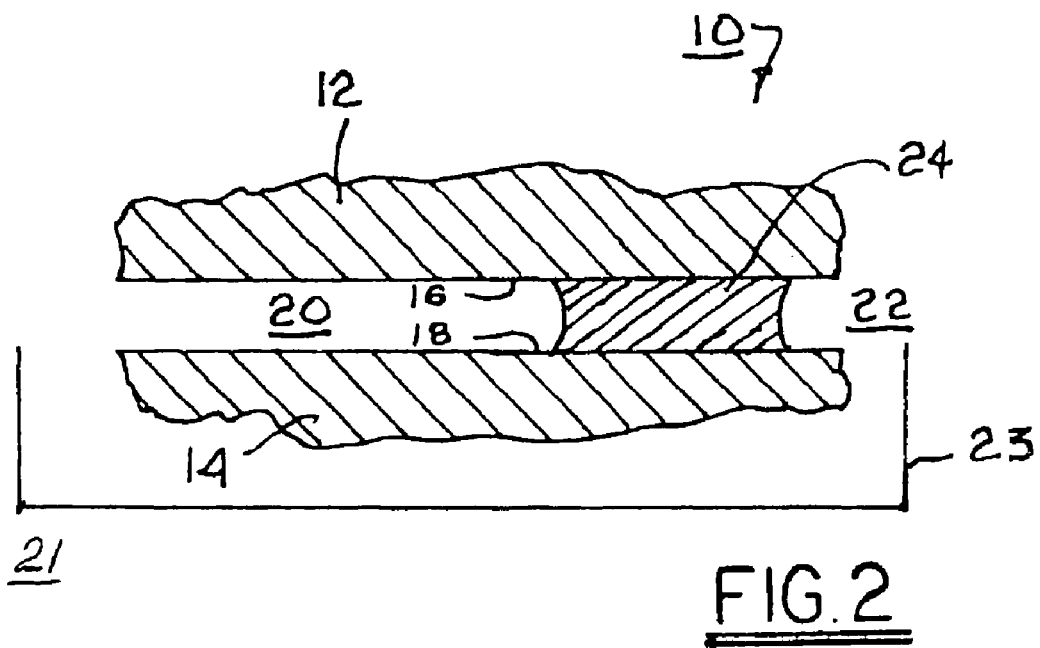
FIG. 2 is an elevational cross-sectional view of a portion of a fuel cell stack assembly having gasketing in accordance with the invention, the assembly being suitable for use as an auxiliary power unit in a vehicle.
Figure 3:
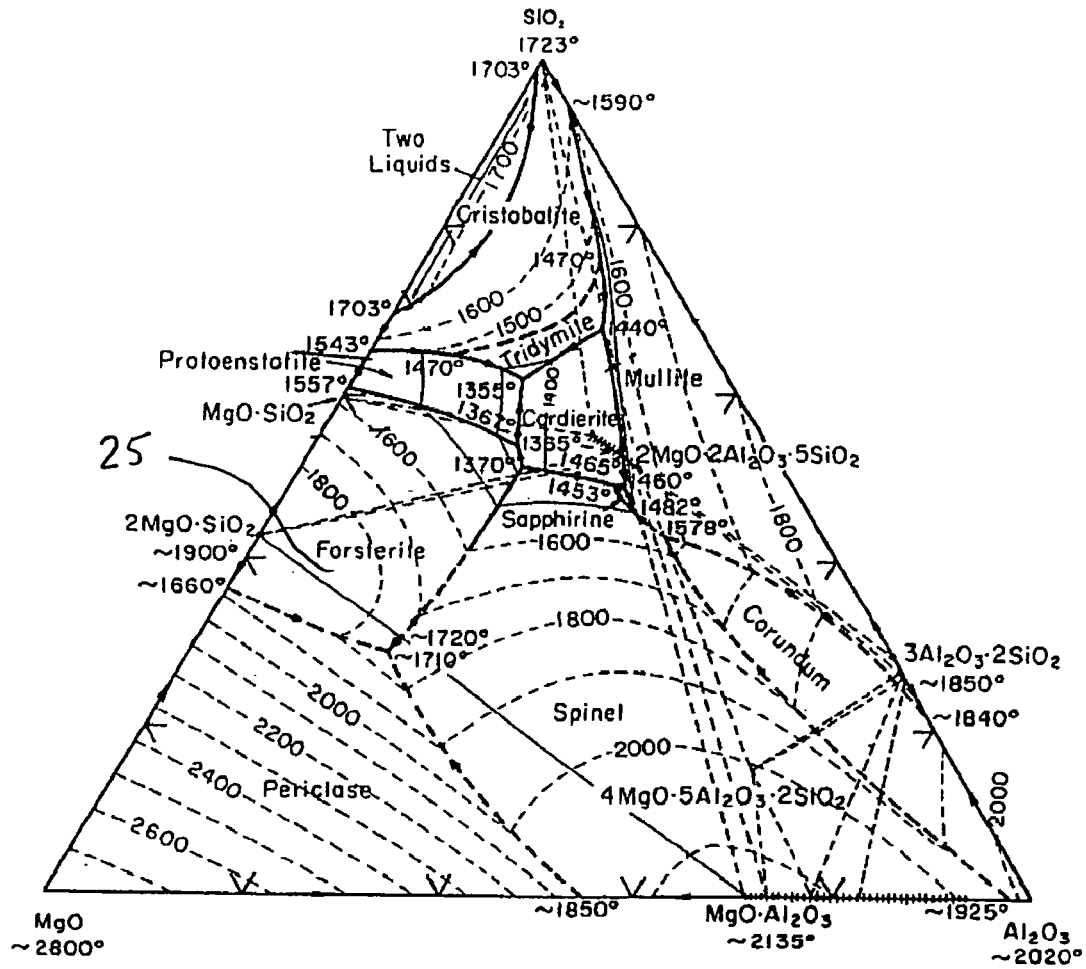
FIG. 3 is a ternary phase diagram for anorthite (CaO—$Al_2O_3$-$2SiO_2$), tridymite ($SiO_2$), and forsterite ($2MgO$—$SiO_2$), showing the stability range and crystallization curves for pure forsterite.

Referring to FIGS. 2 and 3, fuel cell stack assembly 10 includes first and second fuel cell elements 12,14 formed for mating along respective surfaces 16,18. A first space 20 between elements 12, 14 may be provided for passage of gas within assembly 10. Surfaces 16,18 must be sealed to prevent leakage of gas from space 20 to the exterior 22 of the assembly.

Assembly 10 may be suitably employed, for example, as an auxiliary power unit 23 in a vehicle 21.

A gasket element 24 is disposed between surfaces 16 and 18 for providing such a seal. In some applications, an additional spacer (not shown) may be provided between elements 12,14, in which case it may be necessary to gasket both surfaces of the spacer rather than gasketing surface 16 directly to surface 18.

Gasket element 24 comprises at least in part a mineral composition of the magnesium silicates series, preferably the composition known mineralogically as forsterite 25. Preferably, the entire gasket is formed of forsterite, a material which is high in heat resistance, has excellent mechanical strength and a coefficient of linear expansion very close to that of the metal substrate. The high melting point and the heat resistance of magnesium silicates make them a preferable material for the production of gaskets. The magnesium silicates have rigorous oxidation-reduction environment stability, excellent electrical insulation and high heat endurance (up to 1700 deg. C.).

The nominal formula for forsterite is $Mg_2SiO_4$, magnesium silicate. The forsterite is in a distinct crystalline phase that is detectable by x-ray diffraction, and has distinctly different diffraction peaks than those of magnesium oxide and silicon dioxide. The preferred nominal chemical composition of the gasket when formed entirely of forsterite is 66.6 mol. % MgO and 33.0 mol. % $SiO_2$.

For improved electrical resistance and bonding, the gasket composition may also include $Al_2O_3$ In the preferred composition, the forsterite compound consists of less than 20 mol % $Al_2O_3$, and preferably less than 5 mol % $Al_2O_3$ in order to maintain a favorable coefficient of thermal expansion of the composition.

The nominal coefficient of thermal expansion of the forsterite material is 10.0 to 11.5 cm/cm degree $C.\times 10^{-6}$. The nominal dielectric constant is 5.0 to 7.0 at $10^6$ Hz at 25° C. The nominal flexure strength is 20-25 K psi. Porosity and gas permeability are insignificant.

Forsterite gaskets may be formed directly to the sealing surfaces of the fuel cell components using methods and techniques known in the prior art, such as thermal spraying or vapor deposition applied in a single layer or multiple layers. Pre-formed sheeted gaskets of forsterite may also be used.

Figure 4:
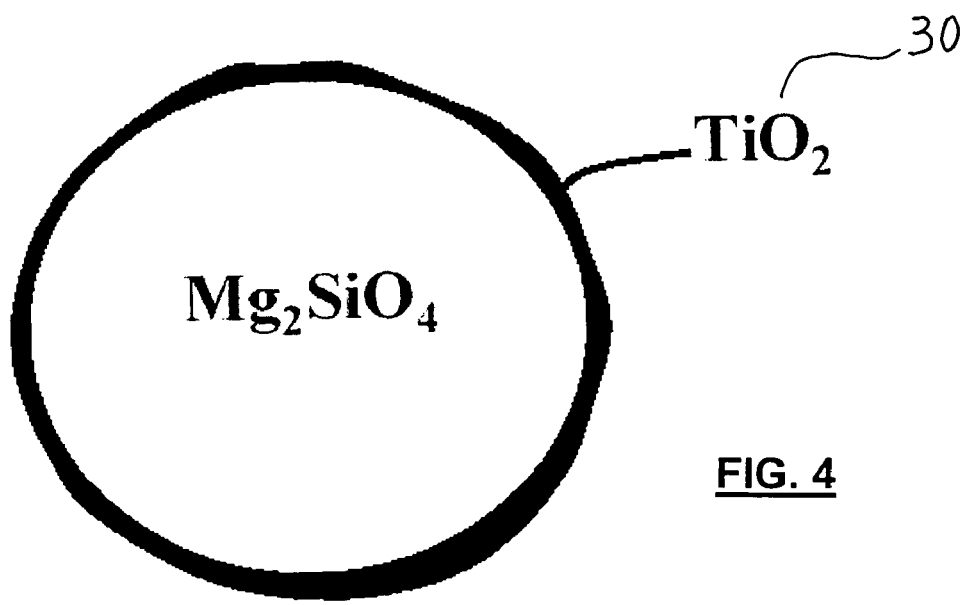
FIG. 4 represents a grain of forsterite including an inhibitor addition formed in its grain boundary.

Gasket durability problems as a result of it being exposed to hydrogen and carbon monoxide in a fuel cell can be attributed to undesirable glassy-phase content and impurities aggregated in the ceramic grain boundaries of the gasket. Forsterite gaskets are based on silicate network formers ($Si^{+4}$) interconnected through oxygen atoms at tetrahedral corners. A grain growth inhibitor addition, particularly other isoelectronic +4 cationic ions such as $Ti^{+4}$ and $Zr^{+4}$, are found to be most effective for leaving the forsterite silicate $Si^{+4}$ structure intact. Since titania and zirconia are not capable of disrupting the silicate structure, they remain in the forsterite grain boundaries where they keep the grain boundaries glassy-phase free, impurity free and pore free. This phenomenon is represented by FIG. 4 which shows an inhibitor addition, such as titania 30, forming in the grain boundary of a forsterite molecule. The small microcrystalline forsterite grains are prevented by the grain growth inhibitor addition from aggregating into submicron and larger forsterite grains. Grain growth inhibition results in a more reliably sintered gasket which has been found to exhibit an enhanced high temperature strength.

Preferably, the titania or zirconia inhibitor additions are limited to up to 10% by weight of the forsterite compound. Additions over 10% by weight can begin decomposing of forsterite grain edges by forming compounds such as $MgTi_2O_5$. With additions exceeding 50% by weight, the forsterite silicate structure begins to breakdown forming a $MgO$—$SiO_2$—$TiO_2$ phase.

As the average particle size of the forsterite powder used to pre-form gaskets increases, a high sintered density of the gasket becomes difficult to obtain. Therefore, it is preferred that the organometallic powdered precursors of the inhibitor addition particles be in the nanoscale, preferably less than 200 nanometers. These nanoscale inhibitor addition particles mixed with the larger bimodal forsterite particles result in a trimodal powder size distribution, that is, particles of nanoscale of less than 200 nanometers, preferably between 10 nanometers and 150 nanometers, particles of sub-micron scale having an average particle size ($d_{50}$) of 0.2 microns to 0.5 microns and particles of micron scale having an average particle size ($d_{50}$) of 2.0 microns to 5.0 microns. In a preferred embodiment, 25 wt % to 45 wt % of the total weight of the trimodal powder comprises the forsterite micron scale particles, 25 wt % to 45 wt % of the total weight of the trimodal powder comprises the forsterite sub-micron scale particles, and 10 wt % to 35 wt % of the total weight of the trimodal powder comprises the inhibitor addition nanoscale particles.

A trimodal powder distribution allows compaction of the pre-sintered gasket from particles having the greatest possible packing density. The improved packing density advantageously provides the pre-sintered gaskets increased strength allowing the gaskets to be processed without fracturing. Also, high packing density results in the lower shrinkage and more uniform shrinkage across the entire gasket.

A pre-sintered low shrinkage gasket can be processed close to the final sintered gasket dimensions. Low and uniform shrinkage increases the strength and durability of the sintered gasket. Further, gasket densification can be accomplished at lower sintering temperatures thereby reducing undesirable ceramic reactions and transformations from occurring.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell assembly comprising:
a plurality of components including two adjacent fuel cell components defining a space there between for the passage of gas in the fuel cell assembly; and a gasketing element positioned at a joint and bonded in place between said adjacent fuel cell components for sealing said joint, said gasketing element including a composition comprising forsterite, wherein the resultant seal is impermeable to said gas, wherein said gasketing element is pre-formed as a gasket, wherein said gasketing element further comprises an inhibitor addition effective to inhibit forsterite grains from aggregating into larger forsterite grains, wherein said pre-formed gasket is formed from a powder having a trimodal size distribution comprising nanoscale particles, sub-micron scale particles and micron scale particles, wherein said nanoscale particles have an average particle size (ds0) of about 10 nm to about 150 nm, wherein said sub-micron scale particles have an average particle size (ds0) of about 0.2 microns to about 0.5 microns, and wherein said micron scale particles have an average particle size (ds0) of about 2.0 microns to about 5.0 microns, wherein the nanoscale particles comprise the inhibitor addition and the sub-micron scale particles and micron scale particles comprise forsterite.

2. A fuel cell assembly in accordance with claim 1 wherein said assembly is a solid oxide fuel cell assembly.

3. A fuel cell assembly in accordance with claim 1 wherein said composition further comprises a dielectric material including forsterite and $Al_2O_3$.

4. A fuel cell assembly in accordance with claim 3 wherein said composition comprises less than about 20 mol. % $Al_2O_3$.

5. A fuel cell assembly in accordance with claim 3 wherein said composition comprises less than about 5 mol. % $Al_2O_3$.

6. A fuel cell assembly in accordance with claim 1 wherein said gasketing element is bonded in place between said two adjacent components with a braze alloy.

7. A fuel cell assembly in accordance with claim 1 wherein said gasketing element is applied to at least one of said two adjacent components by a method selected from the group consisting of thermal spraying and vapor deposition.

8. A fuel cell assembly in accordance with claim 1 wherein said inhibitor addition is selected from the group consisting of titania and zirconia.

9. A fuel cell assembly in accordance with claim 8 wherein said pre-formed gasket is formed from a powder having a trimodal size distribution comprising nanoscale particles, sub-micron scale particles and micron scale particles, wherein the nanoscale particles comprise the inhibitor addition and the sub-micron scale particles and micron scale particles comprise forsterite.

10. A fuel cell assembly in accordance with claim 9 wherein said micron scale particles have an average particle size (ds0) of about 2.0 microns to about 5.0 microns.

11. A fuel cell assembly in accordance with claim 9 wherein said micron scale particles comprise about 25 wt % to about 45 wt % of the total weight of the trimodal powder.

12. A fuel cell assembly in accordance with claim 9 wherein said sub-micron scale particles have an average particle size (ds0) of about 0.2 microns to about 0.5 microns.

13. A fuel cell assembly in accordance with claim 9 wherein said sub-micron scale particles comprise about 25 wt % to about 45 wt % of the total weight of the powder.

14. A fuel cell assembly in accordance with claim 9 wherein said nanoscale particles have an average particle size (ds0) of about 10 nm to about 150 nm.

15. A fuel cell assembly in accordance with claim 9 wherein said nanoscale particles comprise about 10 wt % to about 35 wt % of the total weight of the trimodal powder.

16. In a fuel cell, a pre-formed gasket comprising forsterite and an inhibitor addition effective to inhibit forsterite grains from aggregating into larger forsterite grains, wherein an amount of said inhibitor addition is between about 5% to about 10% by weight of said forsterite, wherein said gasket is formed from a powder having a trimodal size distribution comprising nanoscale particles, sub-micron scale particles and micron scale particles, wherein said nanoscale particles have an average particle size (ds0) of about 10 nm to about 150 nm, wherein said sub-micron scale particles have an average particle size (ds0) of about 0.2 microns to about 0.5 microns, and wherein said micron scale particles have an average particle size (ds0) of about 2.0 microns to about 5.0 microns, wherein the nanoscale particles comprise the inhibitor addition and the sub-micron scale particles and micron scale particles comprise forsterite.

17. A gasket in accordance with claim 16 wherein said inhibitor addition is selected from the group consisting of titania and zirconia.

18. A gasket in accordance with claim 16 wherein said gasket is formed from a powder having a trimodal size distribution comprising nanoscale particles, sub-micron scale particles and micron scale particles~ wherein the nanoscale particles comprise the inhibitor addition and the sub-micron scale particles and micron scale particles comprise forsterite.

19. A gasket in accordance with claim 18 wherein said micron scale particles have an average particle size (ds0) of about 2.0 microns to about 5.0 microns.

20. A gasket in accordance with claim 18 wherein said micron scale particles comprise about 25 wt % to about 45 wt % of the total weight of the powder.

21. A gasket in accordance with claim 18 wherein said sub-micron scale particles have an average particle size (ds0) of about 0.2 microns to about 0.5 microns.

22. A gasket in accordance with claim 18 wherein said sub-micron scale particles comprise about 25 wt % to about 45 wt % of the total weight of the powder.

23. A gasket in accordance with claim 18 wherein said nanoscale particles have an average particle size (ds0) of about 10 nm to about 150 nm.

24. A gasket in accordance with claim 18 wherein said nanoscale particles comprise about 10 wt % to about 35 wt % of the total weight of the powder.

25. A gasket in accordance with claim 16 wherein said pre-formed gasket is positioned at a joint between adjacent fuel cell components in the fuel cell for sealing said joint, wherein said adjacent fuel cell components define a space there between for the passage of gas in the fuel cell, and wherein said pre-formed gasket is impermeable to said gas.

26. A gasket in accordance with claim 16 wherein said gasket is non-fibrous.

27. A gasket in accordance with claim 16 wherein said gasket is a sintered gasket.

28. A fuel cell assembly in accordance with claim 1 wherein said gasketing element is non-fibrous.

29. A fuel cell assembly in accordance with claim 1 wherein said gasketing element is a sintered gasketing element.

* * * * *